(12) United States Patent
Malcolm (10) Patent No.: US 8,027,954 B2
(45) Date of Patent: Sep. 27, 2011

(54) PORTABLE MEDIA PLAYER RECOMMENDATION SYSTEM

(75) Inventor: David H. Malcolm, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 342 days.

(21) Appl. No.: 11/809,637

(22) Filed: May 31, 2007

(65) Prior Publication Data

US 2008/0301149 A1 Dec. 4, 2008

(51) Int. Cl.
G06F 17/30 (2006.01)
(52) U.S. Cl. .................................. 707/621; 707/959
(58) Field of Classification Search ............... 707/104.1, 707/102, 10, 959, 621; 709/203, 217; 711/162; 455/414.1
See application file for complete search history.

(56) References Cited

U.S. PATENT DOCUMENTS

| | | | |
|---|---|---|---|
| 6,771,749 B1 * | 8/2004 | Bansal et al. ............... 379/88.17 |
| 6,976,028 B2 * | 12/2005 | Fenton et al. ................. 707/102 |
| 6,990,498 B2 * | 1/2006 | Fenton et al. ................. 707/102 |
| 7,051,173 B2 * | 5/2006 | Tsuchiya et al. .............. 711/162 |
| 7,065,501 B1 * | 6/2006 | Brown et al. .................... 705/28 |
| 7,376,696 B2 * | 5/2008 | Bell et al. ...................... 709/203 |
| 7,426,637 B2 * | 9/2008 | Risan et al. .................... 713/165 |
| 7,483,958 B1 * | 1/2009 | Elabbady et al. ............. 709/217 |
| 7,627,608 B2 * | 12/2009 | Strandell et al. ...................... 1/1 |
| 7,640,214 B2 * | 12/2009 | Black et al. ...................... 705/43 |
| 7,783,767 B2 * | 8/2010 | Collazo ......................... 709/229 |
| 7,792,756 B2 * | 9/2010 | Plastina et al. .................. 705/51 |
| 7,797,740 B2 * | 9/2010 | Blom et al. ...................... 726/21 |
| 7,814,022 B2 * | 10/2010 | Gupte ............................. 705/59 |
| 7,831,199 B2 * | 11/2010 | Ng et al. ...................... 455/3.06 |
| 2007/0155307 A1 * | 7/2007 | Ng et al. ...................... 455/3.01 |
| 2007/0161402 A1 * | 7/2007 | Ng et al. .................... 455/554.2 |
| 2007/0173236 A1 * | 7/2007 | Vishwanathan et al. ... 455/414.1 |
| 2007/0244924 A1 * | 10/2007 | Sadovsky et al. ........... 707/104.1 |
| 2007/0264982 A1 * | 11/2007 | Nguyen et al. ............. 455/414.1 |
| 2007/0283046 A1 * | 12/2007 | Dietrich et al. ............... 709/245 |
| 2008/0301149 A1 * | 12/2008 | Malcolm ......................... 707/10 |
| 2008/0305738 A1 * | 12/2008 | Khedouri et al. ........... 455/3.06 |
| 2009/0164516 A1 * | 6/2009 | Svendsen et al. .......... 707/104.1 |

* cited by examiner

Primary Examiner — Jean M Corrielus
(74) Attorney, Agent, or Firm — Lowenstein Sandler PC (57) ABSTRACT

A method and apparatus for providing a portable device recommendation system. The method may include storing, on a portable device, preferences of a user of the portable device with respect to media content, and facilitating sharing of desirable media content between this user and a user of another portable device based on the user preferences.

21 Claims, 9 Drawing Sheets

PORTABLE MEDIA PLAYER RECOMMENDATION SYSTEM

TECHNICAL FIELD

Embodiments of the present invention relate to portable media players, and more specifically to a portable media player recommendation system.

BACKGROUND

Portable devices have become increasingly popular. One of most popular types of portable devices is a portable media player. Portable media players can load and play different formats of video (e.g., MPEG, DivX, XviD, SMV, etc.), audio (e.g., MP3, WAV, Ogg Vorbis, etc.), digital images (e.g., BMP, JPEG, GIF, etc.), and interactive media (e.g., Adobe® Flash, Flash LITE, etc.).

A user can download new media content to a portable media player by connecting the portable media player to a host computer, accessing a website of a media content provider via a browser on the host computer, and selecting desired media files listed on the website. A media content provider can track media files selected by the user and determine user preferences with respect to media content. Next time the user accesses the website of the media content provider, the media content provider can use the user preferences to identify media content that may be of interest to the user, and automatically offer this media content to the user. Although this feature is advantageous as it relieves the user from a task of browsing through numerous media files offered on the website, it is cumbersome to use because it requires the user to be connected to the network.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and apparatus for providing a portable device recommendation system. In particular, user preferences with respect to media content are stored locally on the portable device of the user, and are used to identify media content that the user would like to have, and/or media content that the user is not interested in. Media content may include, for example, video, audio (e.g., music or other recordings), digital images, interactive media (e.g., streaming video and audio), etc. The user preferences may be updated when the portable device receives new media content. For example, a media file identified as desirable may be deleted from the user preferences once this media file is downloaded to the portable device.

In one embodiment, a recommendation system residing on the portable device uses the user preferences to recommend media content that may be of interest to the user. In particular, the local recommendation system may discover nearby portable devices and compare media content on those devices with the user preferences on the current device. Upon finding media content that may be of interest to the current user, the recommendation system may notify the current user and/or send a request for this media content to a corresponding portable device.

In another embodiment, the local recommendation system may discover nearby portable devices and request user preferences from those devices. If the recommendation system finds media content residing locally that matches preferences of a user of a nearby device, the recommendation system may notify the current user that he or she can offer the matching media content to the user of the nearby device.

In yet another embodiment, the local recommendation system automatically detects when another portable device having media content desired by the current user is nearby and sends a request for the desired media content to the other portable device. In still another embodiment, the local recommendation system acts as a social matching tool by identifying users of nearby devices (e.g., in a musical festival) that have preferences similar to those of the current user.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
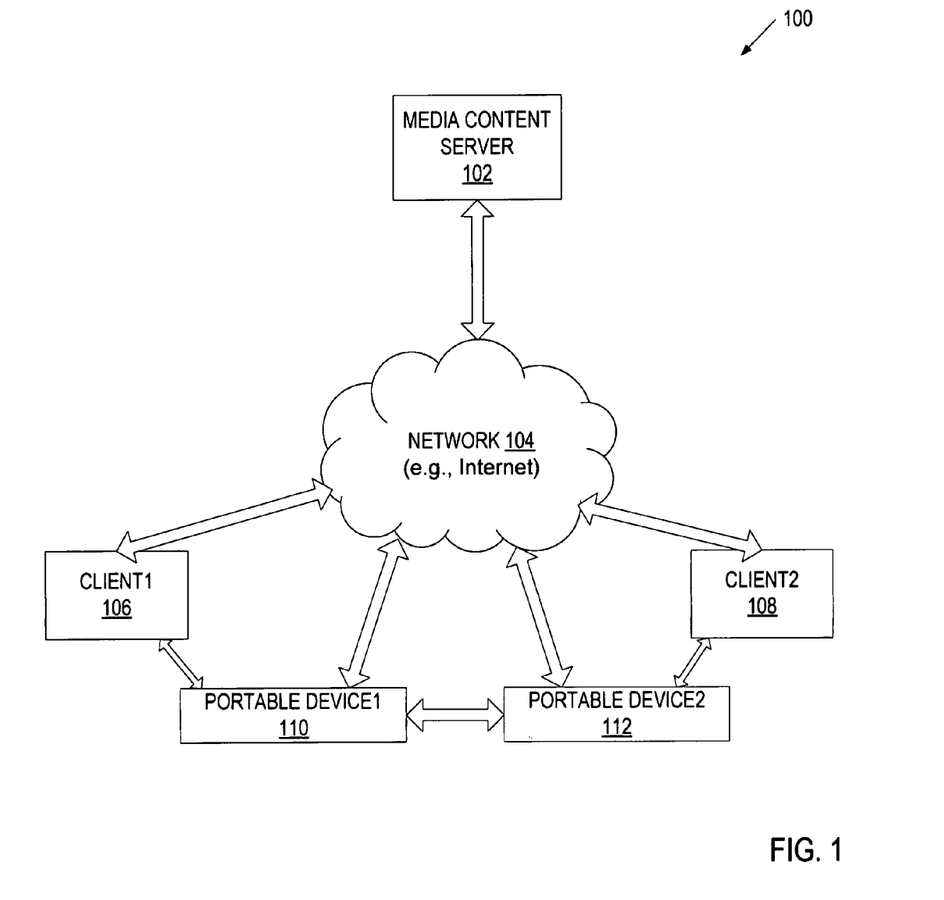
FIG. 1 is a block diagram of an exemplary architecture in which embodiments of the invention may be implemented.

FIG. 1 illustrates an exemplary system architecture 100 in which embodiments of the present invention may operate. The system architecture 100 may include a media content server 102 coupled to a network 104 (e.g., a public network such as Internet or a private network such as a local area network (LAN)). The media content server 102 provides various media files to multiples users. Media files may include, for example, different formats of video (e.g., MPEG, DivX, XviD, SMV, etc.), audio (e.g., MP3, WAV, Ogg Vorbis, etc.), digital images (e.g., BMP, JPEG, GIF, etc.), and interactive media (e.g., Adobe® Flash, Flash LITE, etc.). Media files may have metadata or other tags that identify characteristics of the file content. For example, music tracks may have such tags as category, artist, composer, lyrics author, album, etc.

Based on user selection and/or rating of media files, the media content server 102 may determine user preferences with respect to media content and store them for future use. The media content server 102 may update the user preferences over time based on differences in user selections. The media content server 102 may also include a recommendation system that provides recommendations for users based on their selections and ratings. In particular, the recommendation system of the media content server 102 may examine the selections and ratings of a large number of users, predict which selections are likely to be favored by individual users, and generate recommendations for the individual users based on the predictions.

Media files provided by the media content server 102 may be downloaded to multiple portable devices (e.g., portable devices 110 and 112). Portable devices 110 and 112 may be portable media players (e.g., ipod, Mp3 players, HMP-A1, YP-T8, etc.), mobile phones, personal digital assistants (PDAs), hand-held devices, etc. Portable devices 110 and 112 may access the media content server 102 via the network 104 to download selected media files. Alternatively, portable devices 110 and 112 may connect to clients 106 and 108 respectively and download selected media files via browser applications residing on clients 106 and 108. Clients 106 and 108 may be, for example, personal computers (PCs), terminals, laptops, hand-held devices, etc.

In one embodiment, portable devices 110 and 112 receive preferences of corresponding users with respect to media content when downloading selected media files from the media content server 102 or when issuing a request for user preferences to the media content server 102. In another embodiment, a user of the portable device 110 or 112 may enter his or her preferences on the client 106 or 108 (e.g., via a rich client application interface or a web browser). The client 106 or 108 may then download the relevant user preferences to the portable device 110 or 112 when such a device is connected to the client. In yet another embodiment, the portable devices 110 and 112 may provide a user interface to allow users to enter their preferences with respect to media content directly. In still another embodiment, the recommendation system of the media content server 102 may generate a list of the media files most likely to be of interest to the user, and create user preference data based on this list for download to the portable device 110 or 112. For example, the user preference data downloaded to the portable device may include a list of metadata for the first 15,000 media files recommended for the user by the recommendation system of the media content server 102, along with data indicating the probability that the user is likely to enjoy the media files in the list. In another example, the recommendation system of the media content server 102 may run an algorithm that compresses the list of media files likely to be of interest to the user by analyzing similarities in the metadata. When the portable device 110 or 112 receives the user preferences, it stores them in a local store. The user preferences may be stored in a format that identifies media files that the user is interested in. For example, the portable device 110 may store music files tagged with artists A, B and C, and the user preferences stored on the portable device 110 may indicate that the user is also interested in music files tagged with artists D, E and F. While a variety of formats may be used to indicate the user interest in specific media files, one exemplary format may be as follows:

(
    artist IS "The Libertines"
    or
    artist IS "Crass"
)

In another embodiment, the user preferences may be stored in a format that also (or instead) identifies media files that the user is not interested in. Referring to the example above, although the user might be interested in artist="The Libertines", and the media content server 102 may offer to sell him artist="The Libertines", album="Up the Bracket," he might have already purchased that album on CD and have no wish to have it on the music player. While a variety of formats may be used to indicate that the user is not interested in specific media files, one exemplary format may be as follows:

(
    artist IS "The Libertines"
    and
    album IS NOT "Crass"
)

In one embodiment, the portable devices 110 and 112 communicate with each other (e.g., using WiFi or Bluetooth protocol) and utilize local user preferences to allow their users to share media content with each other (e.g., using a remote procedure call (RPC) protocol), as will be discussed in more detail below. By storing user preferences locally and sharing media content with nearby devices, users are allowed to receive new media content files at any time, regardless of whether or not their portable devices are connected to a network or a host computer.

Figure 2:
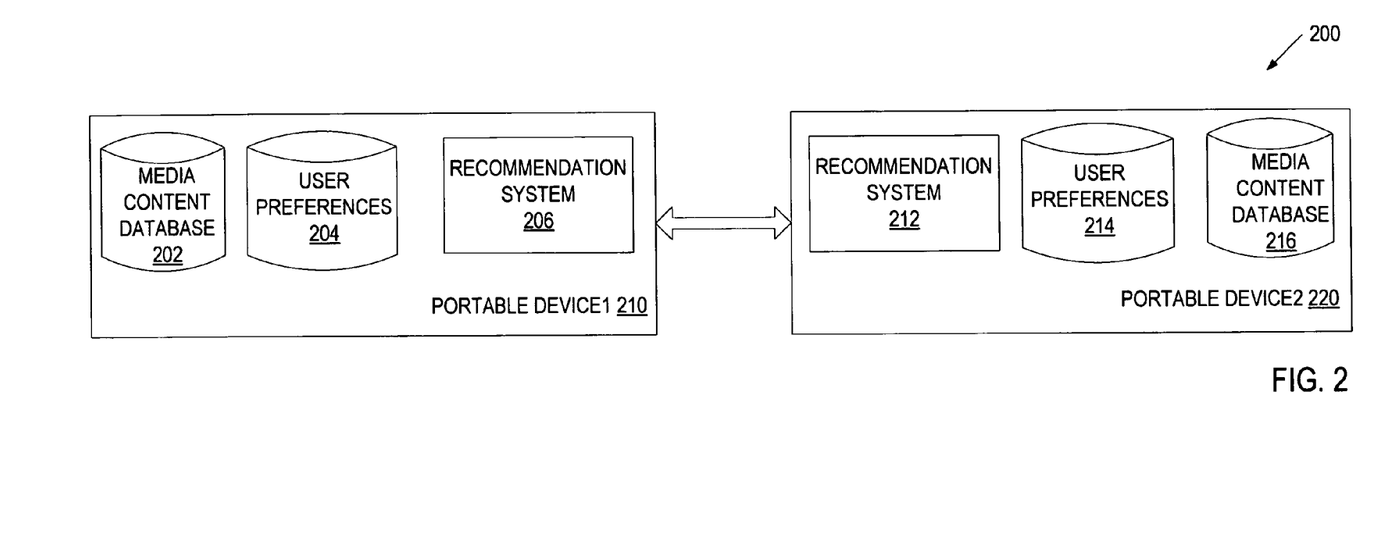
FIG. 2 is a block diagram illustrating the operation of portable devices according to one embodiment of the invention.

FIG. 2 is a block diagram illustrating the operation of portable devices in accordance with one embodiment of the present invention. As shown, portable device 210 includes a media content database 202, a user preferences store 204 and a recommendation system 206. Similarly, portable device 220 includes a media content database 216, a user preferences store 214 and a recommendation system 212. The media content databases 202 and 216 each store media files with metadata or other tags that identify characteristics of the file content. For example, music files may include such tags as category, artist, composer, lyrics author, album, etc.

The user preferences stores 204 and 214 each include user preferences with respect to media content that may identify media files desired by a corresponding user and/or media files not desired by the corresponding user. In one embodiment, there is a correlation between the media content database 202 and the user preferences store 204. That is, media files identified as desirable in the user preferences store 204 are not included in the database 202. Similar correlation also exists between the user preferences store 214 and the media content database 216.

The portable devices 210 and 220 each host a recommendation system (systems 206 and 212 respectively). The recommendation systems 206 and 212 facilitate sharing of desired media content between respective users. In particular, the recommendation system 206 may discover the portable device 220 (e.g., via WiFi, Bluetooth protocol, cellular type of wireless capabilities, etc.) when it is located in proximity to the portable device 210, and request user preferences from the device 220. Sharing of user preferences may be performed by exposing an XML-RPC interface on a TCP/IP port. An exemplary syntax for requesting user preferences may be as follows: string getPreferences(void)

An exemplary syntax for returning user preferences may be as follows:

```
Productions:
grammar: preference*
preference: [like-stmnt|dislike-stmnt]
like-stmnt: LIKE [PROBABILITY] expr
dislike-stmnt: DISLIKE expr
expr: simple-expr | and-expr | or_expr
simple-expr: [TAGNAME relationship STRING]
relationship: EQ NEQ GT LT GTE LTE
and-expr: LPAREN expr AND expr RPAREN
or-expr: LPAREN expr OR expr RPAREN
Tokens:
STRING: \"*\"
LPAREN: (
EQ: =
NEQ: !=
GT:   >
LT:   >
GTE:  >=
LTE:  >=
RPAREN: )
TAGNAME: [artist|album|genre\... etc]
LIKE: like
DISLIKE: dislike
PROBABILITY: 0\.[0-9]*[1-9]
```

An example of user preferences using the above format may be as follows:

```
LIKE (artist="The Libertines" or artist="Dirty Pretty Things")
LIKE (genre="Punk" AND releasedate<"1990")
DISLIKE (artist="Blink 182")
```

When the recommendation system 206 receives user preferences from the portable device 220, it analyze these user preferences to find media files in the database 202 that may be of interest to the user of the portable device 220. The recommendation system 206 may then notify the recommendation system 212 about these files or inform the user of the portable device 210 that he or she can offer these files to the user of the portable device 220 (e.g., via a text message).

In an alternative embodiment, the recommendation system 206 may discover the portable device 220 when it is located in proximity to the portable device 210 and request a list of metadata describing media files from the media content database 216 with corresponding tags. Once the recommendation system 212 provides the requested list, the recommendation system 206 may compare this list with the user preferences 204 and identify media files on the list that are of interest to the user of the portable device 210. The recommendation system 206 may then notify the user of the portable device 210 about these media files, and then request these files from the portable device 220 upon the approval of the user of the portable device 210.

In yet another embodiment, the recommendation system 206 may request user preferences 214 from the device 220 when it is located nearby the device 210 and compare the user preferences 214 with user preferences 204. If the user preferences 204 and 214 are similar, the recommendation system 206 may notify the user of the portable device 210 about the user of the device 220 indicating that both of them have similar interests in media content, thus providing a social matching tool to the users.

Figure 3:
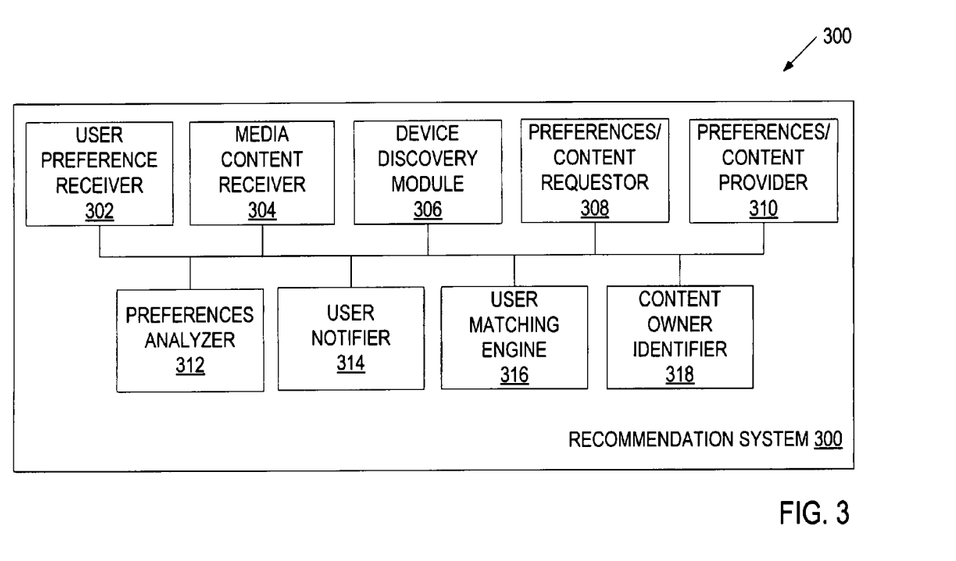
FIG. 3 is a block diagram of one embodiment of a recommendation system.

FIG. 3 is a block diagram of one embodiment of a recommendation system 300. The recommendation system 300 includes a user preference receiver 302, a media content receiver 304, a device discovery module 306, a preferences/content requestor 308, a preferences/content provider 310, a preferences analyzer 312, a user notify 314, a user matching engine 316, and a content owner identifier 318.

The media content receiver 304 receives media files (e.g., audio such as music tracks, video, digital images, etc.) and stores them in a local database. The media content receiver 304 stores media files with tags characterizing the content of the files. The tags may be created by the media content receiver 304 or be supplied by providers of media files. The media content receiver 304 may receive media files from a web server, a host computer (e.g., host PC), or other portable devices located near the current portable device.

The user preference receiver 302 receives preferences of the user with respect to media content and stores them in a local store. As discussed above, the user preferences may be stored in a format that identifies media files desired by the user and/or media files not desired by the user. Tags discussed above may be used to allow the user to specify desired and/or undesired media files. The user preference receiver 302 may receive user preferences from a content provider, a host computer, or the user entering his or her preferences via a user interface provided by the recommendation system 300. The user preference receiver 302 may restructure the received user preferences according to a predefined format prior to storing them in the local store. In one embodiment, the user preference receiver 302 modifies the user preferences stored in the local store when media files marked as desired in the user preferences are received by the media content receiver 304.

The device discovery module 306 discovers portable devices located near the current portable device. The device discovery module 306 may discover nearby devices using wireless communication capabilities such as Bluetooth, WiFi or cellular type of wireless capabilities.

The preferences/content requestor 308 requests user preferences, a list of metadata describing media files, and/or media files themselves from nearby portable devices. In addition, the preferences/content requestor 308 receives the requested user preferences and metadata lists from the nearby devices and passes them to the preferences analyzer 312. The preferences/content requester 308 may also receive the media files from the nearby devices and pass them to the media content receiver 304. The preferences/content provider 310 receives requests of nearby portable devices for user preferences, lists of media files, and/or media files, compiles requested data and sends it to the requesting devices.

The preferences analyzer 312 analyzes received user preferences and/or lists of media files, and compares this data with local user preferences and/or local media files. Based on the comparison, the preferences analyzer 312 may identify media files stored on nearby devices that may be of interest to the current user. In addition (or alternatively), the preferences analyzer 312 may identify media files stored locally that may be of interest to users of nearby portable devices.

The user notifier 314 notifies the current user about media files on a nearby device that may be of interest to the current user. In addition (or alternatively), the user notifier 314 may notify the current user about local media files that may be of interest to a user of a nearby device. In yet another embodiment, the user notifier 314 may inform the current user about users of nearby portable devices that have similar media content interests. The user matching engine 316 finds users of nearby portable devices that have user preferences similar to those of the current user.

The content owner identifier 318 determines from the user preferences what media file the current user is interested in, and questions each nearby portable device about this media file. Upon finding a nearby portable device that stores the desired media file, the content owner identifier 318 sends a message to the nearby portable device, notifying the user of the nearby portable device that the current user is interested in this media file.

Figure 4:
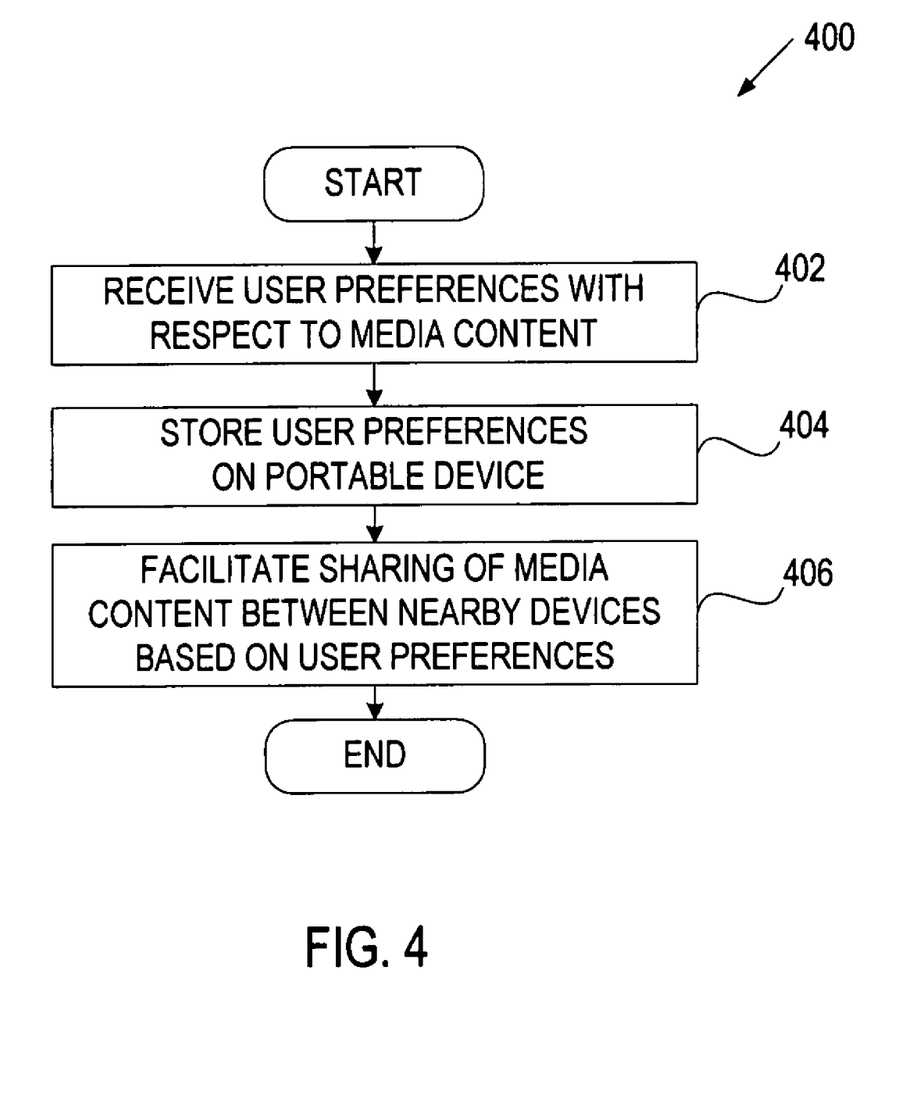
FIG. 4 is a flow diagram of one embodiment of a method for identifying media content files desired by a user.

FIG. 4 is a flow diagram of one embodiment of a method 400 for identifying media content desired by a user. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a portable device 110 or 112 of FIG. 1, which may be a portable media player, a mobile phone, a PDA, etc.

Referring to FIG. 4, method 400 begins with processing logic receiving user preferences with respect to media content (block 402). The media content may include, for example, audio, video, digital images, interactive media, etc. The user preferences may identify media files desired by the user and/or media files undesired by the user. Processing logic may receive the user preferences from a media content server, a host computer, or via a user interface provided by the portable device.

At block 404, processing logic stores the user preferences in a local store on the portable device. Prior to storing, processing logic may restructure the user preferences according to a predefined format. In one embodiment, processing logic automatically modifies the user preferences when media files identified as desired or undesired in the user preferences are added to a local media content database.

At block 406, processing logic utilizes the user preferences to facilitate sharing of media content between the user of the current portable device and one or more users of other portable devices located in proximity to the current portable device. Sharing of media content may be facilitated in various ways, including but not limited to those that are discussed below in conjunction with FIGS. 5A-7.

Figure 5A:
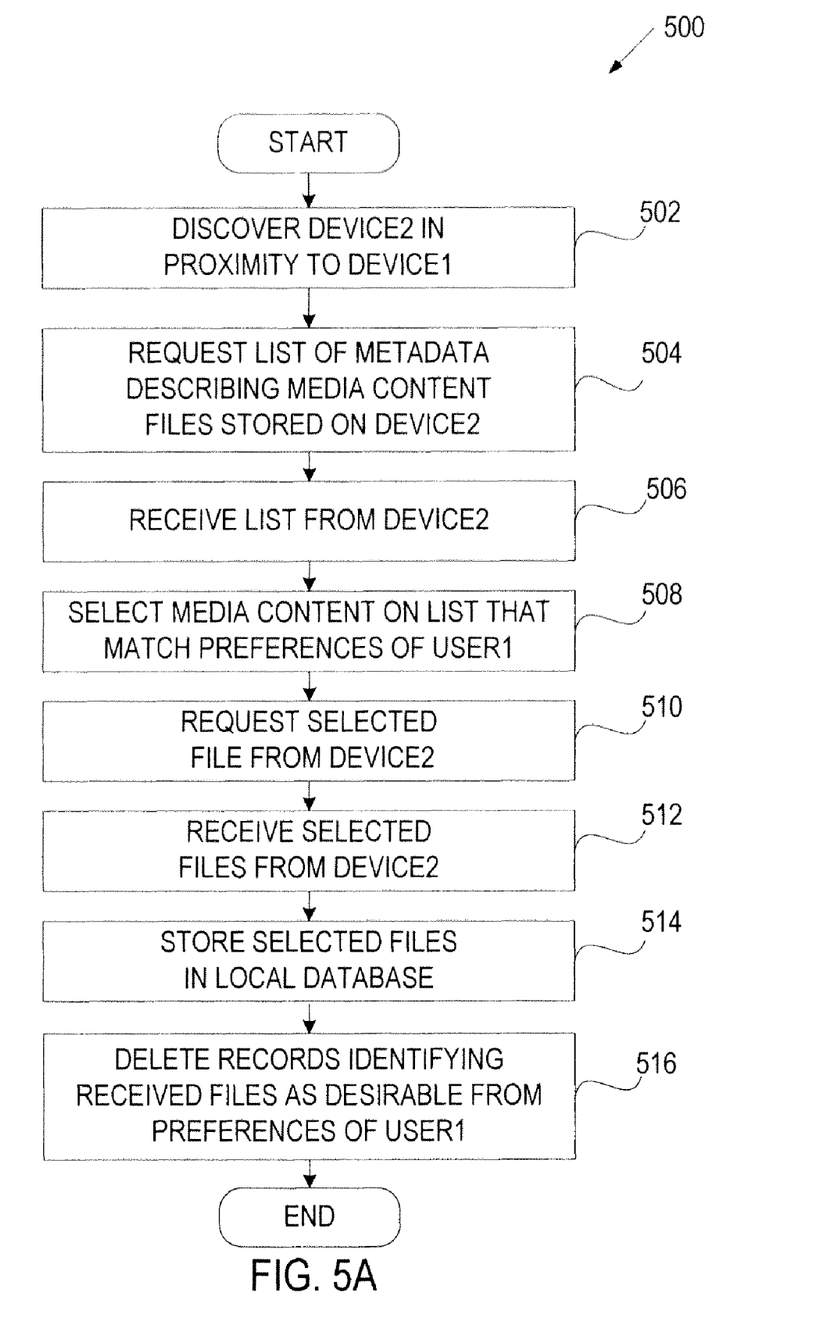
FIG. 5A is a flow diagram of one embodiment of a method for sharing media files among users of portable devices.
Figure 5B:
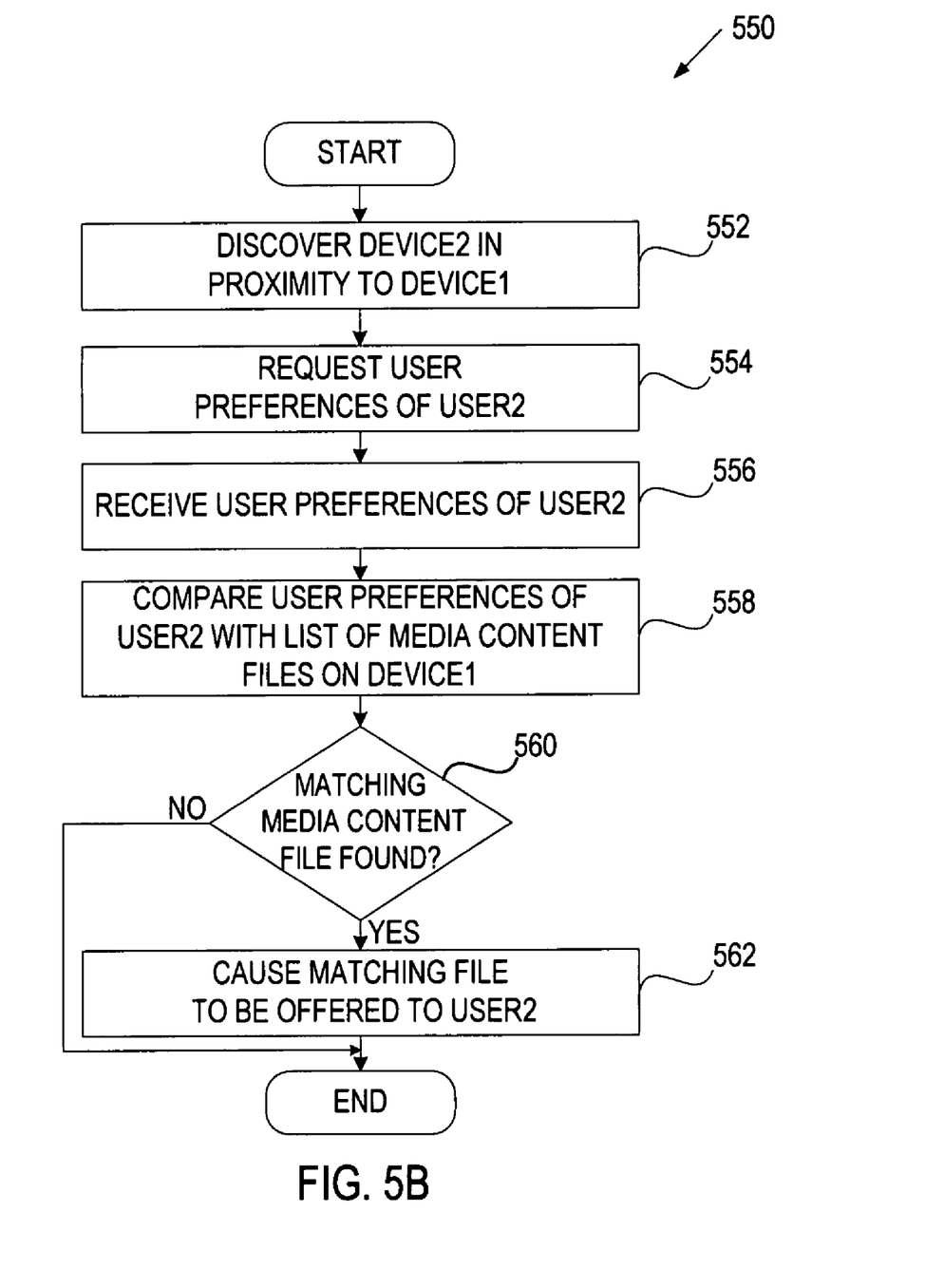
FIG. 5B is a flow diagram of an alternative embodiment of a method for sharing media files among users of portable devices.
Figure 6:
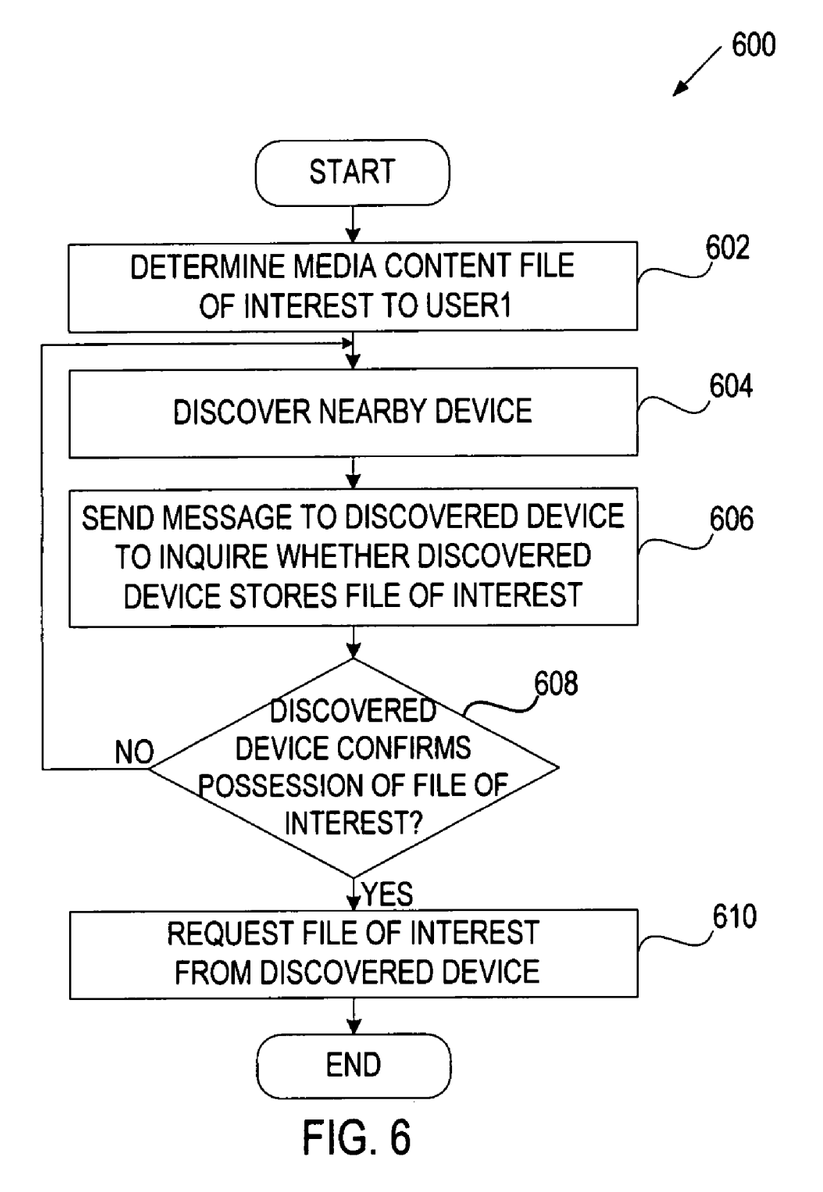
FIG. 6 is a flow diagram of yet another embodiment of a method for sharing media files among users of portable devices.

FIGS. 5A, 5B and 6 are flow diagrams of alternative embodiments of a method for sharing media content among nearby devices. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a portable device 110 or 112 of FIG. 1, which may be a portable media player, a mobile phone, a PDA, etc.

Referring to FIG. 5A, method 500 begins with processing logic discovering device 2 in proximity to current device 1 (block 502). At block 504, processing logic requests a list of metadata describing media files stored on device 2. At block 506, processing logic receives the requested list of metadata from device 2. At block 508, processing logic analyzes user preferences stored on device 1 using the received list of metadata from device 2, and selects from the list media files that match the user preferences of user 1.

At block 510, processing logic requests the selected media files from device 2. In one embodiment, prior to sending this request, processing logic notifies user 1 about the selected media files and waits for input of user 1 that indicates the user approval of the request.

Next, processing logic receives the requested media files from device 2 (block 512) and stores these media files in a local database (block 514). In one embodiment, processing logic deletes records identifying these media files as desirable from the user preferences stored on device 1 (block 516).

Referring to FIG. 5B, method 550 begins with processing logic discovering device 2 in proximity to current device 1 (block 552). At block 554, processing logic requests user preferences of user 2 that are stored on device 2. At block 556, processing logic receives the requested preferences of user 2 from device 2. At block 558, processing logic compares the user preferences of user 2 with a list of media files stored on device 1. If processing logic finds a media content file stored on device 1 that matches the user preferences of user 2 (block 560), processing logic causes the matching media file to be offered to user 2 (block 562). In particular, processing logic may automatically send the matching media file to device 2, or notify user 1 of the matching media file desired by user 2 and let user 1 to send the matching file to device 2 or offer the matching file to user 2 (e.g., via a text message). Otherwise, if processing logic does not find a media content file on device 1 that matches the user preferences of user 2, method 550 ends.

It should be noted that methods of FIGS. 5A and 5B may be combined to identify in a single process media files on device 2 that are desired by user 1 as well as media files on device 1 that are desired by user 2. This single process may utilize user preferences of both users 1 and 2 and media files stored on the two devices.

Referring to FIG. 6, method 600 begins with processing logic determining which media file is of interest to user 1 based on user preferences stored on device 1 (block 602). At block 604, processing logic discovers a device near device 1.

At block 606, processing logic sends a message to the nearby device to inquire whether the nearby device stores the file desired by user 1.

If processing logic receives a confirmation that the nearby device has the desired file (block 608), processing logic requests the desired file from the nearby device (block 610). Alternatively, processing logic may inform user 1 that the nearby device has the desired file, allowing user 1 to ask a user of the nearby device for the desired file (e.g., via a text message).

If the nearby device does not have the desired file, processing logic returns to block 604 to continue looking for other nearby devices that may contain the desired file.

Figure 7:
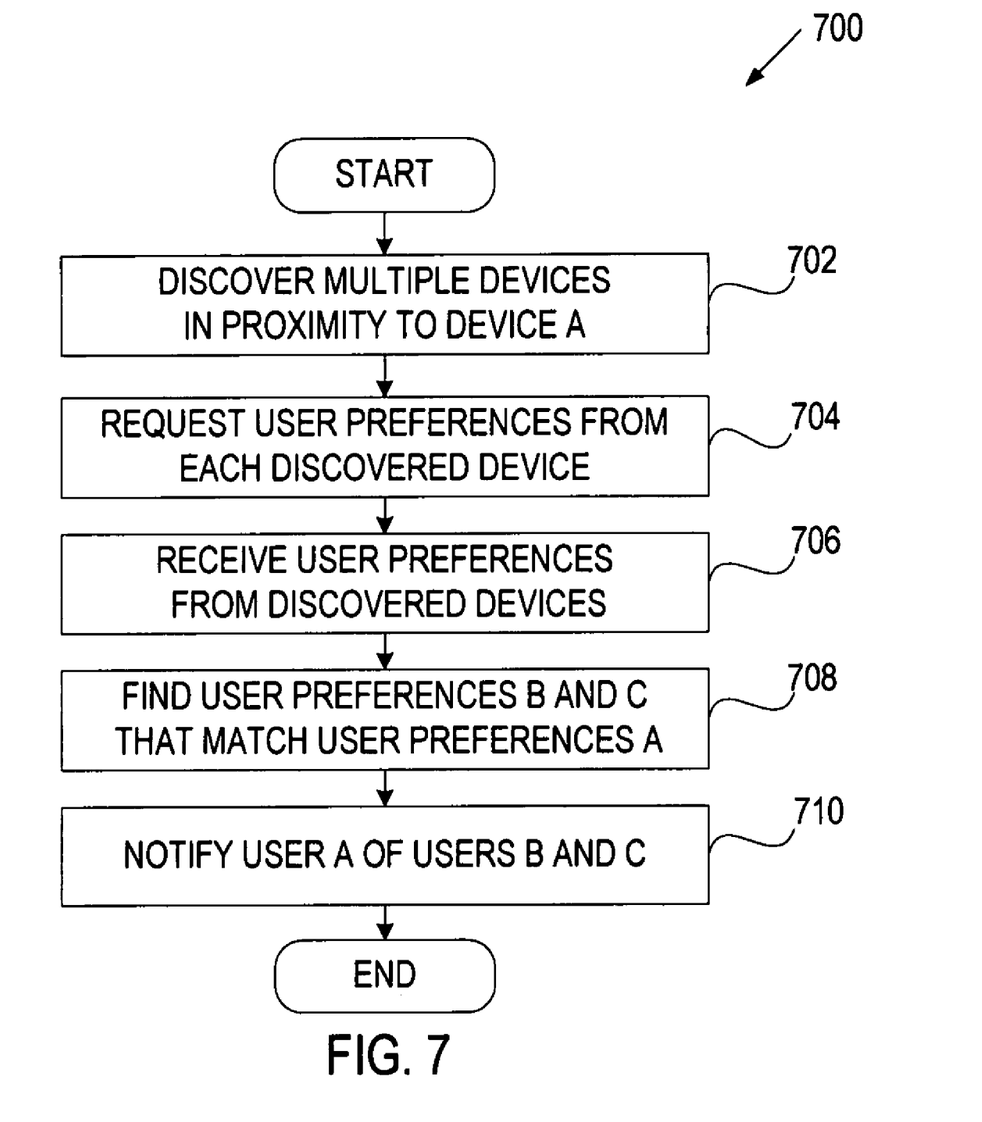
FIG. 7 is a flow diagram of one embodiment of a method for finding users with similar media content preferences.

FIG. 7 is a flow diagram of one embodiment of a method 700 for finding users with similar interests in media content. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a portable device 110 or 112 of FIG. 1, which may be a portable media player, a mobile phone, a PDA, etc.

Referring to FIG. 7, method 700 begins with processing logic discovering one or more devices in proximity to device A (e.g., at a music festival) (block 702). At block 704, processing logic requests user preferences of each discovered device. At block 706, processing logic receives user preferences from the discovered devices. At block 708, processing logic finds preferences of users B and C that are similar to preferences of user A. At block 710, processing logic informs user A that users B and C located nearby have similar interests in media content (e.g., in music).

Figure 8:
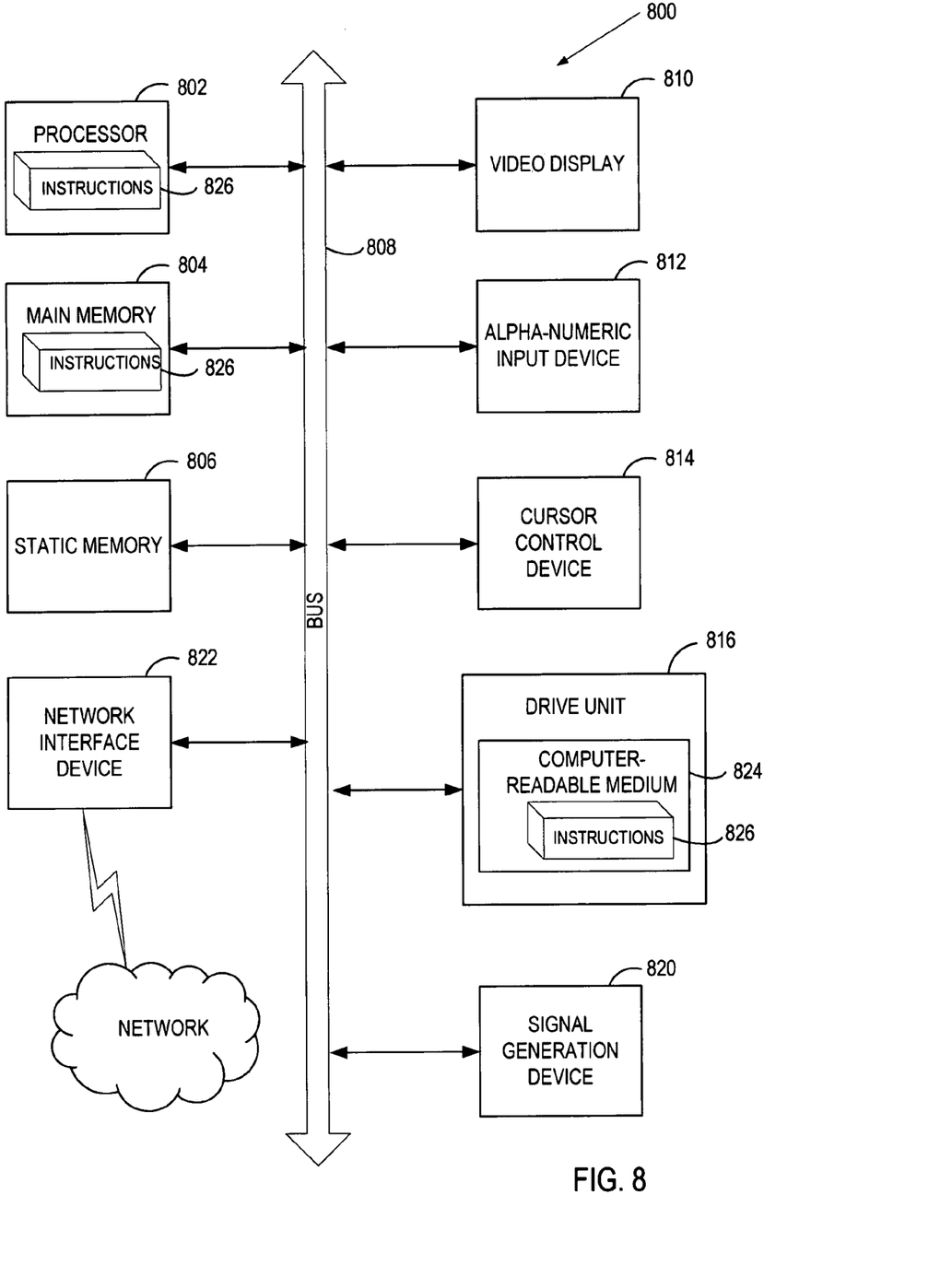
FIG. 8 illustrates a diagrammatic representation of a machine in the exemplary form of a computer system.

FIG. 8 illustrates a diagrammatic representation of a machine in the exemplary form of a computer system 800 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), and a static memory 806 (e.g., flash memory, static random access memory (SRAM), etc.), which may communicate with each other via a bus 830. Alternatively, the processing device 802 may be connected to memory 804 and/or 806 directly or via some other connectivity means.

Processing device 802 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets.

The processing device 802 is configured to execute processing logic 826 for performing the operations and steps discussed herein.

The computer system 800 may further include a network interface device 822. It also may include a video display unit 810 (e.g., a liquid crystal display (LCD) or a cathode ray tube (CRT)), an alphanumeric input device 812 (e.g., a keyboard), a cursor control device 814 (e.g., a mouse), and/or a signal generation device 820 (e.g., a speaker).

The computer system 800 may also include a data storage device 816 having a machine-accessible storage medium 824 on which is stored one or more sets of instructions (e.g., software 826) embodying any one or more of the methodologies or functions described herein. The software 826 may also reside, completely or at least partially, within the main memory 804 and/or within the processing device 802 during execution thereof by the computer system 800, the main memory 804 and the processing device 802 also constituting machine-accessible storage media. The software 826 may further be transmitted or received over a network 820 via the network interface device 822.

While the machine-accessible storage medium 824 is shown in an exemplary embodiment to be a single medium, the term "machine-accessible storage medium" should be taken to include a single medium or multiple media (e.g., a centralized or distributed database, and/or associated caches and servers) that store the one or more sets of instuctions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope equivalents to which such claims are entitled.

What is claimed is:

1. A computer-implemented method for a first portable device, comprising:

storing user preferences with respect to media content on the first portable device, user preferences pertaining to a first user of the first portable device, the user preferences comprising metadata identifying media content desirable to the first user;

discovering, by the first portable device, a second portable device located in a proximity to the first portable device, the second portable device having user preferences pertaining to a second user of the second portable device, the user preferences comprising metadata identifying media content desirable to the second user, the metadata in the user preferences of the first and second users having the same format as metadata of media content files stored on the first and second portable devices;

contacting the second portable device by the first portable device to facilitate sharing of desirable media content between the first user and the second user, wherein contacting the second portable device by the first portable device comprises: the first portable device requesting the metadata of the user preferences of the second user, comparing metadata of media content files stored on the first portable device with the metadata of the user preferences of the second user, selecting one or more files from the metadata of media content files that are likely to be desirable to the second user based on the metadata in the user preferences of the second user, and offering the selected files to the second user; and when the selected files are shared between the first user and the second user, causing metadata identifying the selected files as desirable to be deleted from the user preferences of the second user.

2. The method of claim 1 wherein the media content comprises at least one of audio or video.

3. The method of claim 1 further comprising:
storing a plurality of media content files on the first portable device, each of the plurality of media content files being associated with one or more characteristics of file content.

4. The method of claim 1 further comprising:
receiving the user preferences from at least one of a client, a server or a local user interface module.

5. The method of claim 1 wherein the user preferences comprise metadata identifying files of the desirable media content that are not of interest to a user.

6. The method of claim 1 wherein contacting the second portable device by the first portable device to facilitate sharing of the desirable media content comprises:
finding one or more users of portable devices that have user preferences similar to the user preferences of the first user, the one or more users including the second user; and
notifying the first user about the users with similar user preference.

7. The method of claim 6 wherein finding one or more users of portable devices that have user preferences similar to the user preferences of the first user comprises:
discovering a plurality of nearby portable devices, the plurality of nearby portable devices including the second portable device;
requesting user preferences from each of the plurality of nearby portable devices;
receiving user preferences from each of the plurality of nearby portable devices; and
selecting user preferences similar to the user preferences of the first user.

8. The method of claim 1 further comprising:
receiving a list of media files likely to be desirable to the first user from a recommendation system of a media content server, the list to be stored on the portable device as the user preferences; and
utilizing the user preferences without needing a connection of the portable device to the media content server.

9. A computer-implemented method for a first portable device, comprising:
storing user preferences with respect to media content on the first portable device, user preferences pertaining to a first user of the first portable device, the user preferences comprising metadata identifying media content desirable to the first user;
discovering, by the first portable device, a second portable device located in a proximity to the first portable device, the second portable device having user preferences pertaining to a second user of the second portable device, the user preferences comprising metadata identifying media content desirable to the second user, the metadata in the user preferences of the first and second users having the same format as metadata of media content files stored on the first and second portable devices;
contacting the second portable device by the first portable device to facilitate sharing of desirable media content between the first user and the second user, wherein contacting the second portable device by the first portable device comprises: requesting a list of metadata describing media content files stored on the second portable device, receiving the list of metadata from the second portable device, comparing the metadata of the media content files on the list with the metadata of the user preferences of the first user, and selecting one or more files from the list that are desirable to the first user of the first portable device; and when the selected files are shared between the first user and the second user, deleting metadata identifying the selected files as desirable from the user preferences of the first user.

10. The method of claim 9 further comprising:
requesting the selected files from the second portable device; and
downloading the selected files to the first portable device.

11. The method of claim 9 further comprising:
prior to requesting the selected files from the second portable device, recommending the selected files to the first user, and receiving a first user request for the selected files.

12. The method of claim 9 wherein contacting the second portable device by the first portable device to facilitate sharing of the desirable media content comprises:
determining a media content file that is desirable to the first user based on the user preferences of the first user;
sending a message identifying the determined media file to each of a plurality of portable devices discovered in the proximity to the first portable device until receiving a confirmation from a discovered portable device that the discovered portable device stores the determined media file, the plurality of portable devices including the second portable device; and
requesting the determined file from the discovered portable device.

13. A portable device comprising:
a local store having user preferences of a user of the portable device with respect to media content, the user preferences comprising metadata identifying media content desirable to the user of the portable device; and
a recommendation system, coupled to the local store, to discover a second portable device located in a proximity to the first portable device, the second portable device having user preferences pertaining to a second user of the second portable device, the user preferences comprising metadata identifying media content desirable to the second user, the metadata in the user preferences of the first and second users having the same format as metadata of media content files stored on the first and second portable devices, to contact the second portable device to facilitate sharing of desirable media content between the first user and the second user of the second portable device based on the user preferences, wherein contacting the second portable device by the first portable device comprises: requesting a list of metadata identifying media content on the second device, receiving the list of metadata from the second portable device, comparing the metadata of the media content files on the list with the metadata in the user preferences of the first user, and selecting one or more files from the list that are desirable to the first user of the first portable device; and, when the selected files are shared between the first user and the second user, to delete metadata identifying the desirable media content that has been shared as desirable from the user preferences of the first user.

14. The device of claim 13 wherein the user preferences specify media content that is likely not to be desirable to a user.

15. The device of claim 13 wherein the recommendation system is to facilitate sharing of the desirable media content by:
  requesting the selected files from the second portable device; and
  downloading the selected files to the first portable device.

16. The device of claim 13 wherein the recommendation system is to facilitate sharing of the desirable media content by:
  determining a media content file that is desirable to the first user based on the user preferences of the first user;
  sending a message identifying the determined media file to each of a plurality of portable devices discovered in a proximity to the first portable device until receiving a confirmation from a discovered portable device that the discovered portable device stores the determined media file, the plurality of portable devices including the second portable device; and
  requesting the determined file from the discovered portable device.

17. The device of claim 13 wherein the recommendation system is to facilitate sharing of the desirable media content by:
  finding one or more users of portable devices that have user preferences similar to the user preferences of the first user, the one or more users including the second user; and
  notifying the first user about the users with similar user preference.

18. A non-transitory machine-accessible medium including data that, when accessed by a machine, cause the machine to perform a method comprising:
  storing user preferences with respect to media content on the first portable device, user preferences pertaining to a first user of the first portable device, the user preferences comprising metadata identifying media content desirable to the first user;
  discovering, by the first portable device, a second portable device located in a proximity to the first portable device, the second portable device having user preferences pertaining to a second user of the second portable device, the user preferences comprising metadata identifying media content desirable to the second user, the metadata in the user preferences of the first and second users having the same format as metadata of media content files stored on the first and second portable devices;
  contacting the second portable device by the first portable device to facilitate sharing of desirable media content between the first user and the second user, wherein contacting the second portable device by the first portable device comprises: the first portable device requesting the metadata of the user preferences of the second user, comparing metadata of media content files stored on the first portable device with the metadata of the user preferences of the second user, selecting one or more files from the metadata of media content files that are likely to be desirable to the second user based on the metadata in the user preferences of the second user, and offering the selected files to the second user; and
  when the selected files are shared between the first user and the second user, causing metadata identifying the selected files as desirable to be deleted from the user preferences of the second user.

19. The non-transitory machine-accessible medium of claim 18 wherein the user preferences specify media content that is likely not to be desirable to a user.

20. The non-transitory machine-accessible medium of claim 18 wherein contacting the second portable device by the first portable device to facilitate sharing of the desirable media content comprises:
  determining a media content file that is desirable to the first user based on the user preferences of the first user;
  sending a message identifying the determined media file to each of a plurality of portable devices discovered in a proximity to the first portable device until receiving a confirmation from a discovered portable device that the discovered portable device stores the determined media file, the plurality of portable devices including the second portable device; and
  requesting the determined file from the discovered portable device.

21. The non-transitory machine-accessible medium of claim 18 wherein contacting the second portable device by the first portable device to facilitate sharing of the desirable media content comprises:
  finding one or more users of portable devices that have user preferences similar to the user preferences of the first user, the one or more users including the second user; and
  notifying the first user about the users with similar user preference.

* * * * *